Dec. 15, 1931.   D. HELFER   1,836,167
LINE MARK FOR OPTICAL MEASURING INSTRUMENTS
Filed May 1, 1931
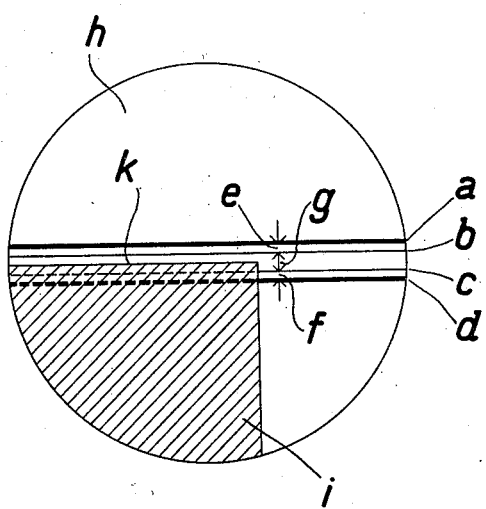
Inventor:
Daniel Helfer Patented Dec. 15, 1931

1,836,167

UNITED STATES PATENT OFFICE

DANIEL HELFER, OF JENA, GERMANY, ASSIGNOR TO THE FIRM CARL ZEISS, OF JENA, GERMANY

LINE MARK FOR OPTICAL MEASURING INSTRUMENTS

Application filed May 1, 1931, Serial No. 534,312, and in Germany May 8, 1930.

The adjusting and reading exactness of optical measuring instruments being frequently rather problematic when the line mark is represented by a single line, this one line has been abandoned in many cases. It has been found out that a line mark consisting of two parallel lines affords a greater adjusting or reading accuracy. However, frequently special cases have to be met in which also these double lines will be of little avail, for instance when the measuring edge of a non-transparent body is to coincide in transmitted light with a line mark in a microscope. As far as it is visible in the field of view of the microscope, the body will darken this field, and thus it is not possible to exactly determine when the measuring edge divides into halves the space between the two lines, which is due to the fact that this space is not visible over its entire breadth. One of the double lines and, at the same time, an unknown amount of the whole breadth of the said space disappear from the observer's view in that part of the field of view which is darkened by the image of the body.

The invention overcomes this disadvantage by providing as a line mark four parallel lines and by making each of the spaces between the lines of the two exterior pairs of lines equal to half the breadth of the space between the lines of the pair of lines in the middle. The breadth of the lines themselves is of secondary importance; the exterior lines are however comparatively broad and take the shape of surfaces. The lines also may be interrupted, they may be drawn on a glass plate or a similar part, or they may be represented by wires or the like.

The accompanying drawing, which represents a constructional example of the invention, illustrates the manner in which the new line mark is used in the adjustment in transmitted light of the measuring edge of a non-transparent body in the field of view of a microscope.

The line mark consists of four parallel lines, $a$, $b$, $c$, $d$, whereof the exterior ones, $a$ and $d$, are comparatively broad. The breadth of the space between the lines $a$ and $b$ amounts to $e$, that between the lines $b$ and $c$ to $g$, and that between the lines $c$ and $d$ to $f$. These spaces are in the proportion $$e = f = \tfrac{1}{2} g.$$

The field of view of the microscope and that part of a non-transparent body which appears in the field of view are designated $h$ and, respectively, $i$. The said body has a measuring edge $k$.

It is obvious that the measuring edge $k$ can be adjusted very precisely to the middle of the line mark. The only thing required is to take care that the space between the measuring edge $k$ and the not covered interior line $b$ equals the space between the two lines $b$ and $a$. The fact that the observer's eye permits of discerning this equality without difficulty bases on the well-known phenomenon in the adjustment of a line to a line mark consisting of two parallel lines. The exterior lines, $a$ and $d$, being broad, that is to say more like surfaces, the resulting contrast effect allows the two spaces visible close to the measuring edge $k$ to appear in approximately the same brightness, which favours avoiding inexact adjustment of this measuring edge $k$.

I claim:

1. A line mark for optical measuring instruments, consisting of four parallel lines, the breadth of the space between the lines of the exterior pairs of lines each being equal to half the breadth of the space between the lines of the pair of lines in the middle.

2. In a line mark according to claim 1 the two exterior lines being broader than the two interior ones.

DANIEL HELFER.